United States Patent
Sutton et al.

(10) Patent No.: US 7,328,181 B2
(45) Date of Patent: Feb. 5, 2008

(54) METHOD AND SYSTEM FOR TRANSACTING AN ANONYMOUS PURCHASE OVER THE INTERNET

(75) Inventors: David B. Sutton, Monroe, MI (US); Douglas E. Blasiman, Bowling Green, OH (US)

(73) Assignee: PrivaCash, Inc., Monroe, MI (US)

( * ) Notice: Subject to any disclaimer, the term of this patent is extended or adjusted under 35 U.S.C. 154(b) by 316 days.

(21) Appl. No.: 11/245,732

(22) Filed: Oct. 7, 2005

(65) Prior Publication Data

US 2006/0080234 A1 Apr. 13, 2006

Related U.S. Application Data

(63) Continuation of application No. 09/363,499, filed on Jul. 29, 1999, now abandoned.

(51) Int. Cl.
*G06Q 40/00* (2006.01)
(52) U.S. Cl. .......................................... 705/35; 705/39
(58) Field of Classification Search ................. 705/35, 705/39
See application file for complete search history.

(56) References Cited

U.S. PATENT DOCUMENTS

| | | | |
|---|---|---|---|
| 5,420,926 A | 5/1995 | Low et al. | |
| 5,511,114 A * | 4/1996 | Stimson et al. | 379/114.16 |
| 5,511,121 A | 4/1996 | Yacobi | |
| 5,577,109 A | 11/1996 | Stimson et al. | |
| 5,621,787 A | 4/1997 | McKoy et al. | |
| 5,663,546 A | 9/1997 | Cucinotta et al. | |
| 5,794,207 A | 8/1998 | Walker et al. | |
| 5,819,234 A | 10/1998 | Slavin et al. | |
| 5,883,810 A | 3/1999 | Franklin et al. | |
| 5,884,272 A | 3/1999 | Walker et al. | |
| 5,903,880 A | 5/1999 | Biffar | |
| 5,991,413 A | 11/1999 | Arditti et al. | |
| 6,000,608 A | 12/1999 | Dorf | |
| 6,006,988 A | 12/1999 | Behrmann et al. | |
| 6,014,646 A | 1/2000 | Vallee et al. | |
| 6,105,009 A | 8/2000 | Cuervo | |
| 6,145,741 A | 11/2000 | Wisdom et al. | |

(Continued)

FOREIGN PATENT DOCUMENTS

EP  0 921 487 A1  9/1999

(Continued)

OTHER PUBLICATIONS

Debit Card News, "Banks Enter A New Debit Market, And AmEx Has its Foot in The Door", Nov. 30, 1998.

(Continued)

*Primary Examiner*—Jagdish N Patel
(74) *Attorney, Agent, or Firm*—Brooks Kushman P.C.

(57) ABSTRACT

A method is provided for transacting a purchase using a non-personalized purchase card which is distributed to a number of purchase card outlet each purchase card being a bearer instrument having a non-personalized card holder name without any perspective card holder data thereon. The card is sold at the purchase card outlet and the purchase cardholder can use the card to make a purchase at an unrelated retailer with the transaction cleared over a network connection using a software implemented application that transmits the card issuer without transmitting any user specific information.

18 Claims, 5 Drawing Sheets

U.S. PATENT DOCUMENTS

| | | |
|---|---|---|
| 6,185,545 B1 | 2/2001 | Resnick et al. |
| 6,188,994 B1 | 2/2001 | Egendorf |
| 6,189,787 B1 | 2/2001 | Dorf |
| RE37,122 E | 4/2001 | Levine et al. |
| 6,246,755 B1 | 6/2001 | Walker et al. |
| 6,270,012 B1 * | 8/2001 | Dawson ............... 235/381 |
| 6,341,273 B1 | 1/2002 | Briscoe |
| 6,405,182 B1 | 6/2002 | Cuervo |
| 6,467,684 B2 | 10/2002 | Fite et al. |
| 6,473,500 B1 | 10/2002 | Risafi et al. |
| 6,502,745 B1 | 1/2003 | Stimson et al. |
| 6,615,189 B1 | 9/2003 | Phillips et al. |
| 6,970,852 B1 | 11/2005 | Sendo et al. |
| 2001/0001321 A1 | 5/2001 | Resnick et al. |
| 2001/0042784 A1 | 11/2001 | Fite et al. |
| 2002/0026418 A1 | 2/2002 | Koppel et al. |
| 2002/0026420 A1 | 2/2002 | DuPhily |
| 2002/0174016 A1 | 11/2002 | Cuervo |

FOREIGN PATENT DOCUMENTS

| | | |
|---|---|---|
| WO | WO 96/38801 | 12/1996 |
| WO | 9740616 A1 | 10/1997 |
| WO | WO 99/03057 | 1/1999 |
| WO | WO 01/03033 A1 | 1/2001 |
| WO | 0137228 A1 | 5/2001 |
| WO | WO 01/71673 A1 | 9/2001 |

OTHER PUBLICATIONS

National Petroleum News, "*Plastic Payment Storm Prepares to Touch Down*", Jan. 1997.

American Banker, "*USA Going to Dogs—With Kennel Clubu Visa*", Mar. 18, 1996.

Ambalink Launches Secure Online Shipping in the UK, Universal News Services, Jun. 8, 1999.

Thomas J. Frey, "The Internet Commission", The DaVinci Institute, retrieved from www.davinci-institute.com/the2.htm on Jan. 17, 2001.

Dyan Machan, "An Edison for a New Age?", Forbes Magazine, May 17, 1999, pp. 178-185.

Thomas O. Bennion, "The Debit Card's Expanding Frontiers", Credit Card Management(Magazine), p. 64-62, May 1998, Dialog File 268, Accession No. 00335930.

Jeffrey Kutler, "Visa, MasterCard Square Off for Debit Fight", American Banker(Magazine), p. 3, vol. 153, No. 247, Dec. 20, 1988, Dialog File 625, Accession No. 0094030.

* cited by examiner

US 7,328,181 B2

METHOD AND SYSTEM FOR TRANSACTING AN ANONYMOUS PURCHASE OVER THE INTERNET

CROSS-REFERENCE TO RELATED APPLICATIONS

This application is a continuation of prior U.S. patent application Ser. No. 09/363,499 filed on Jul. 29, 1999 and now abandoned. The disclosure of the above application is incorporated herein by reference.

BACKGROUND OF THE INVENTION

The present invention relates generally to a method for making a purchase over the Internet, and more particularly to a method of transacting an anonymous purchase through the use of intermediary credit account information.

Currently, a consumer wishing to make a purchase over the Internet must utilize their personal credit card. Secured servers utilized by online vendors accept credit cards and provide protection, via various encryption processes, for the interception of credit card information by third party "hackers". However, even if no "hacking" takes place, the vendor ultimately has the consumer's credit card number. Having the credit card number provides a trail back to the consumer's social security number and other private and personal information which the consumer would not normally circulate.

Possession of the credit card number, in effect, gives the vendor the opportunity to circulate information regarding the consumer, including the consumer's history of purchases which may be utilized for mass targeted mailings as well as any other marketing objectives. In addition, by using ones credit card, those purchases made over the Internet that a consumer may otherwise wish to keep confidential appear on the consumer's monthly credit card statement, and thus are available to others having access to the statement. In other words, circulating information relating to the consumer's purchase could prove to be damaging to the consumer. The current mechanism for transacting purchases over the Internet could lead to irreparable harm and embarrassment to one's credit standing as well as one's personal and professional business life. Accordingly, there is a significant need for a means by which a consumer may confidentially make a purchase over the Internet.

Therefore, it is desirable to provide a method of transacting an anonymous purchase through the use of intermediary credit account information. The purchase should be "untraceable" simulating a "cash" transaction which typically occurs in a typical "bricks and mortar" retail setting. This need will continue to grow exponentially as commercial transactions over the Internet continue to grow. Moreover, there is a rapidly growing need for those consumers who do not have access to a credit card to be able to conduct commercial transactions over the Internet. For instance, due to their credit history or age, there are numerous consumers who do not qualify for a credit card account. These types of consumers are fundamentally prohibited from participating in any Internet commerce transaction.

SUMMARY OF THE INVENTION

In accordance with the present invention, a method is provided for transacting an anonymous purchase over the Internet. The method comprises the steps of: (a) acquiring intermediary credit account information from a purchasing intermediary; (b) providing transactional purchase information, including the intermediary credit account information, to a retailer, where the transactional purchase information is provided by the purchaser using a first computing device of a computer-implemented purchasing system; and (c) transacting a purchase between the purchaser and the retailer using the intermediary credit account information, thereby maintaining the anonymity of the purchaser.

For a more complete understanding of the invention, its objects and advantages, refer to the following specification and to the accompanying drawings.

DETAILED DESCRIPTION OF THE PREFERRED EMBODIMENT

Figure 1:
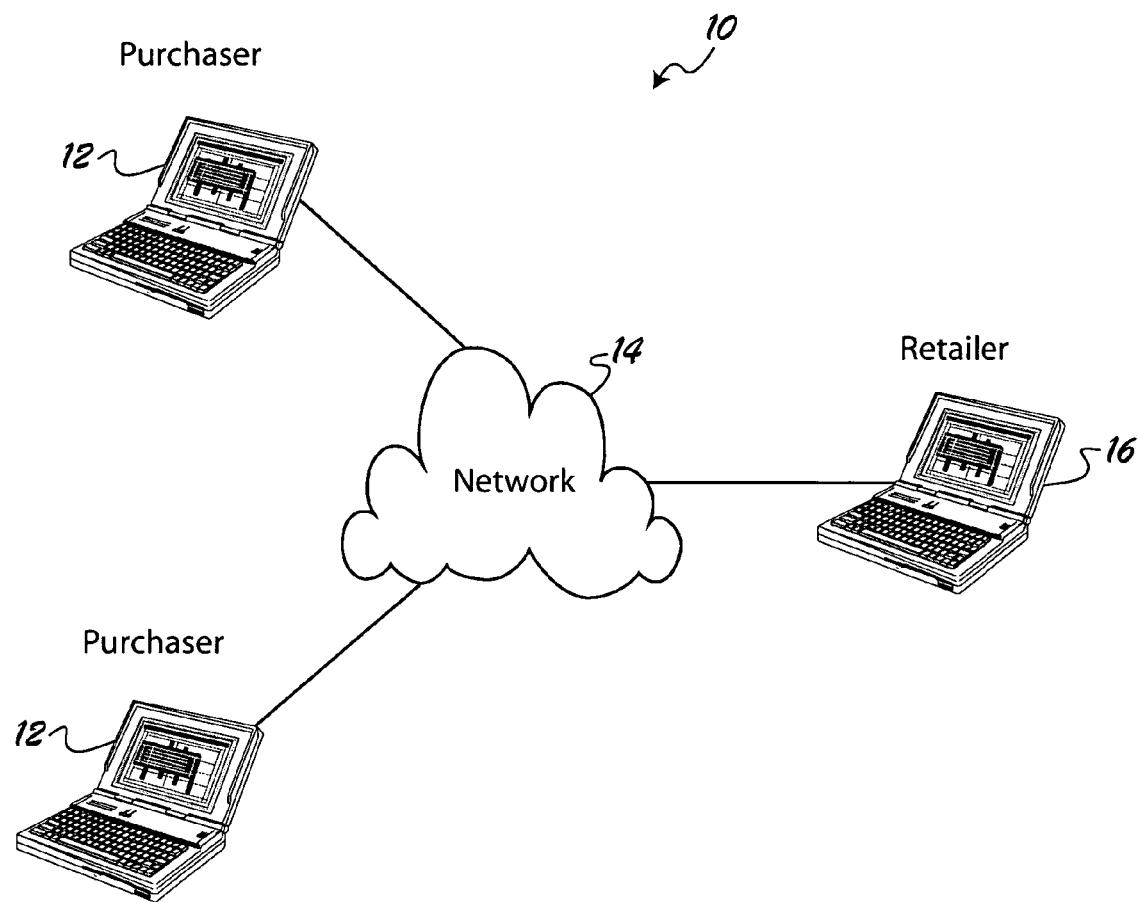
FIG. 1 is a diagram illustrating the basic components of a conventional computer-implemented purchasing system.

FIG. 1 illustrates the basic components of a conventional computer-implemented purchasing system 10. The purchasing system 10 is comprised of a plurality of purchasing computing devices 12 interconnected via a network 14 (e.g., the Internet) to at least one retail computing device 16. As will be apparent to one skilled in the art, the computing devices are able to communicate using common communication protocols (e.g., TCP/IP) over different types of network channels. For illustration purposes, a preferred embodiment of the computing device is a personal computer (PC). Of course, it will be appreciated that the principles of the invention can be employed in a wide variety of computing devices, including but not limited to a telephone, a television or a personal digital assistant (PDA).

Figure 2:
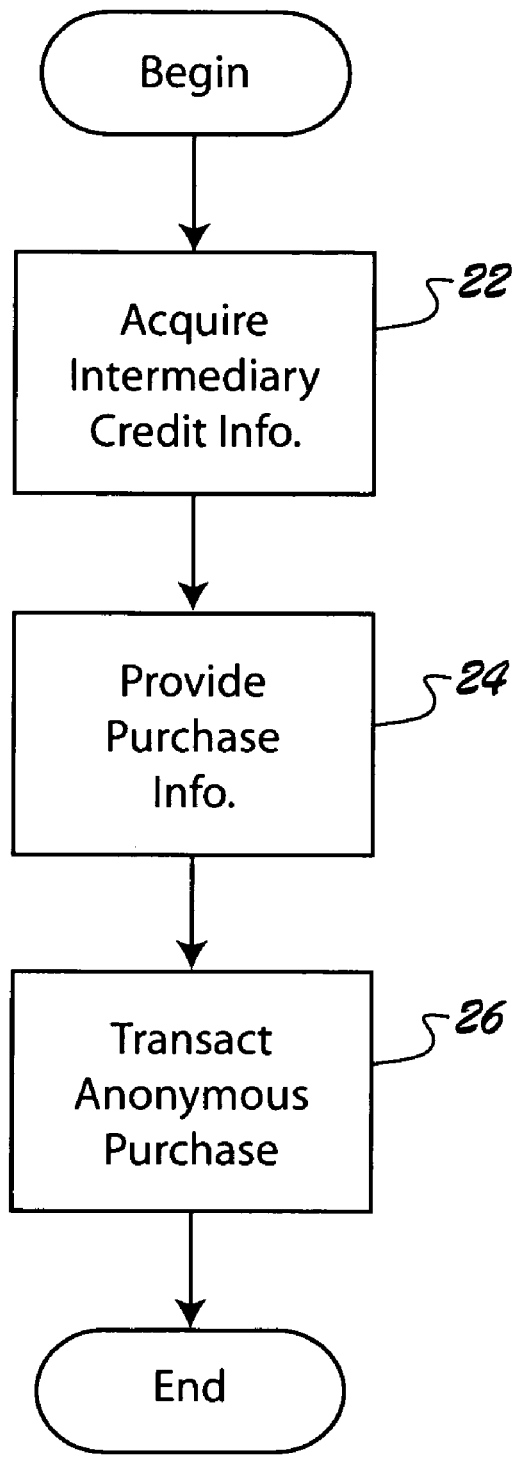
FIG. 2 is a flowchart showing a method for transacting an anonymous purchase in accordance with the present invention.

In accordance with the present invention, an overview of a method for transacting an anonymous purchase using the computer-implemented purchasing system 10 is shown in FIG. 2. First, a purchaser must acquire intermediary credit account information 22 from a purchasing intermediary. Next, the purchaser provides transactional purchase information 24, including the intermediary credit account information, to a retailer, using a purchasing computing device connected to the network 14. Lastly, a purchase is transacted 26 between the purchaser and the retailer through the use of the intermediary credit account information, thereby maintaining the anonymity of the purchaser. While the following description is provided with reference to an intermediary credit account, it is readily understood that an intermediary debit account is within the scope of the present invention.

Figure 3:
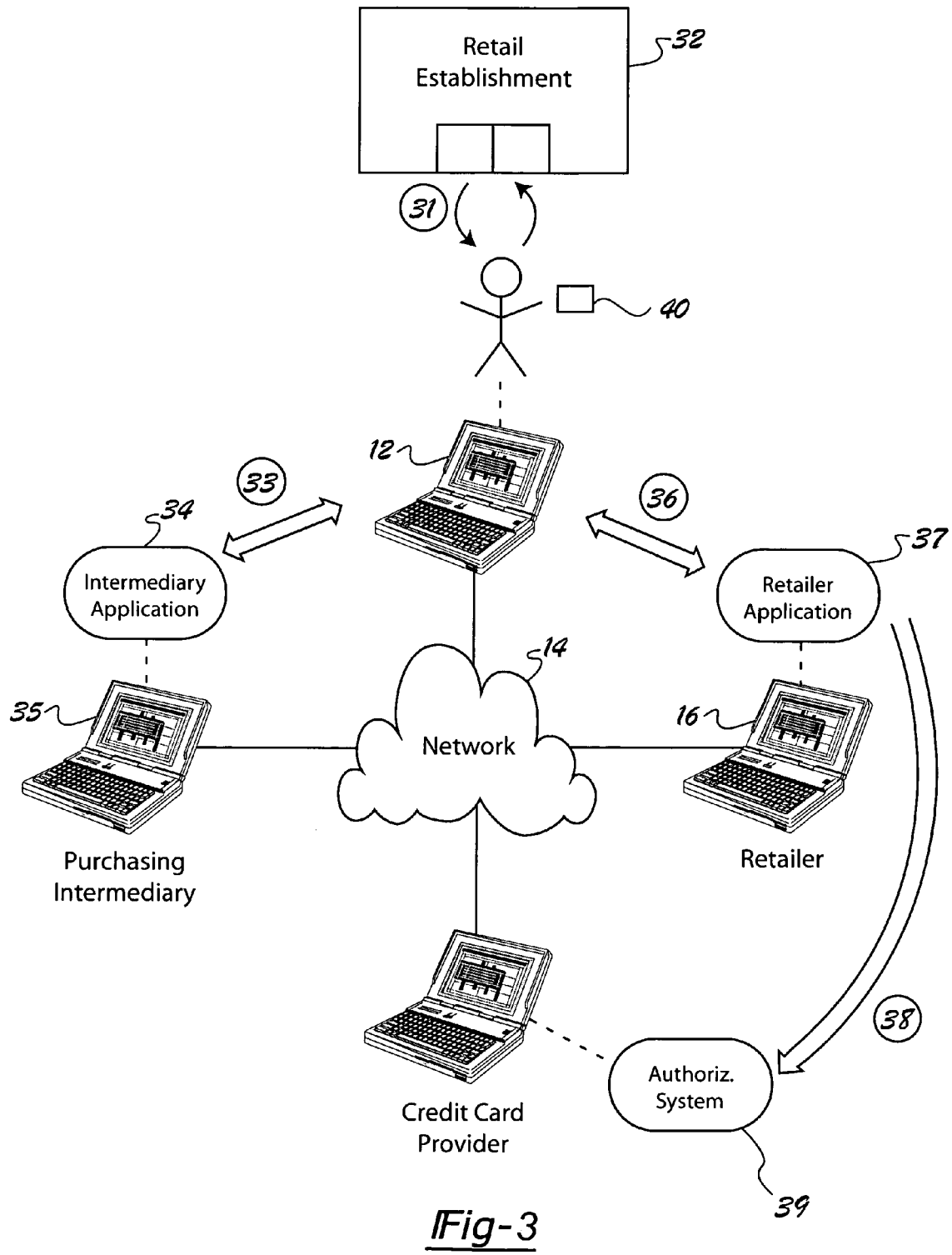
FIG. 3 is a detailed flow diagram of the method for transacting an anonymous purchase in accordance with the present invention.

A more detailed description of the method of the present invention is provided in conjunction with FIG. 3. The method of the present invention operates in a similar fashion to that of a pre-paid phone card. The primary objective of the method is to create a non-traceable means to transact a purchase over the Internet. In order to accomplish this task, there must exist a procedure for converting "real currency" to "Internet currency". In the context of this discussion, "real currency" refers to credit on a credit card or actual currency issued by a national treasury of any country. Therefore, a currency conversion must take place via an intermediary web site over the Internet or in a "bricks and mortar" retailer.

Figure 4A:
FIGS. 4A and 4B are a front and back view, respectively, of an exemplary pre-paid purchasing card in accordance with the present invention.
Figure 4B:

In the case of the "bricks and mortar" retailer, a pre-paid purchasing card is to be offered by the retailer in various predetermined denominations (e.g., $25, $50, or $100). The consumer would visit the retail establishment 32, such as a 7-11 store, a WAL-MART store, or a RITE-AID store, to buy 31 one or more purchasing cards. An exemplary purchasing card 40 is shown in FIGS. 4A and 4B. The purchasing card 40 includes a unique and non-traceable Master Card or Visa credit account number 42, a non-personalized cardholder name 43 (such as the name of the purchasing intermediary) and an expiration date 44 which allows the consumer the ability to make a purchase(s) over the Internet or in other "bricks and mortar" retail establishments. It is envisioned that the card will have a predetermined expiration (e.g., six month) from the date the consumer activates the card. As will be more fully explained below, there is also a credit limit associated with each purchasing card.

Each purchasing card 40 is a non-recourse credit card issued by a credit card provider (e.g., CITIBANK, BANCONE, etc.). The credit card provider sells blocks of purchasing cards to a purchasing intermediary 35. Each purchasing card is sold for a predetermined denomination (e.g., $23, $47 or $97) which corresponds to a credit limit that is associated with the purchasing card 40. The purchasing intermediary 35 in turn sells each purchasing card 40 at a slightly higher cost to a consumer. For instance, a consumer would pay $25 for a purchasing card 40 which has an available credit limit of $22. The $3 difference in cost is a service fee captured by the purchasing intermediary 35. It should also be noted that as additional inducement for providing the actual physical purchasing cards, the credit card provider may receive a fee from the purchasing intermediary for each card which is activated and/or used by a consumer.

The purchasing cards are provided on a consignment basis by the purchasing intermediary 40 to participating retailers 32. Amongst other incentives, the retailer may also receive a fee from the purchasing intermediary for each purchasing card which was purchased at their retail establishment.

The consumer then buys the purchasing card 40 at the retailer establishment 32 either by charging the purchase on the consumer's credit card or through an exchange of actual cash currency. If the consumer elects to buy the purchasing card 40 with a credit card, then consumer's monthly billing statement from the credit card provider simply shows the name of the retailer and the aggregate amount of the purchase. On the other hand, if the consumer elects to buy a purchasing card 40 with cash currency there is no post purchase confirmation process.

In either case, the credit account number on the purchasing card 40 is not part of the transaction, and thus is not linked to the consumer. In other words, each purchasing card 40 is a "bearer card" which means it is as good as cash. Should the consumer lose or misplace the purchasing card 40, it may be used up to the limit available on the card by anyone in possession of the card. In this way, the purchasing card provides a means for preserving the anonymity of the purchaser in future purchases made over the Internet.

Once the consumer buys the purchasing card 40, they then need to activate 33 their purchasing card 40 by contacting the purchasing intermediary 35. It is envisioned that an intermediary software-implemented application 34 resides on a computing device which is operated by the purchasing intermediary 35. Thus, the intermediary application 34 may be accessed by the consumer via the network 14 using a purchasing computing device 12. More specifically, the intermediary application 34 may be associated with a web site on the Internet, where an address for the web site is provided on the purchasing card 40.

The intermediary application 34 is receptive of the credit account number as entered by the consumer and operative to activate the card. To do so, the intermediary application 34 interfaces with a data store which maintains a record for each purchasing card acquired by the purchasing intermediary. Each record includes the account number, the non-personalized cardholder name, the expiration date, a credit limit, an activation flag and other types of account information as is known in the art.

In order to activate their card, the consumer enters the credit account number shown on the purchasing card into the intermediary application 34. No further information is requested of the consumer. One skilled in the art will readily recognize that to activate the purchasing card 40, the intermediary application 34 may interface with an additional authorization system as provided by the credit card provider. Upon activation, the consumer has a set time from the activation date to exhaust the available funds of their purchasing card 40. While the above description discusses contacting the purchasing intermediary via the network, it is readily understood that other means are available for contacting the purchasing intermediary (e.g., via the telephone), thereby activating the purchasing card 40.

Figure 5:
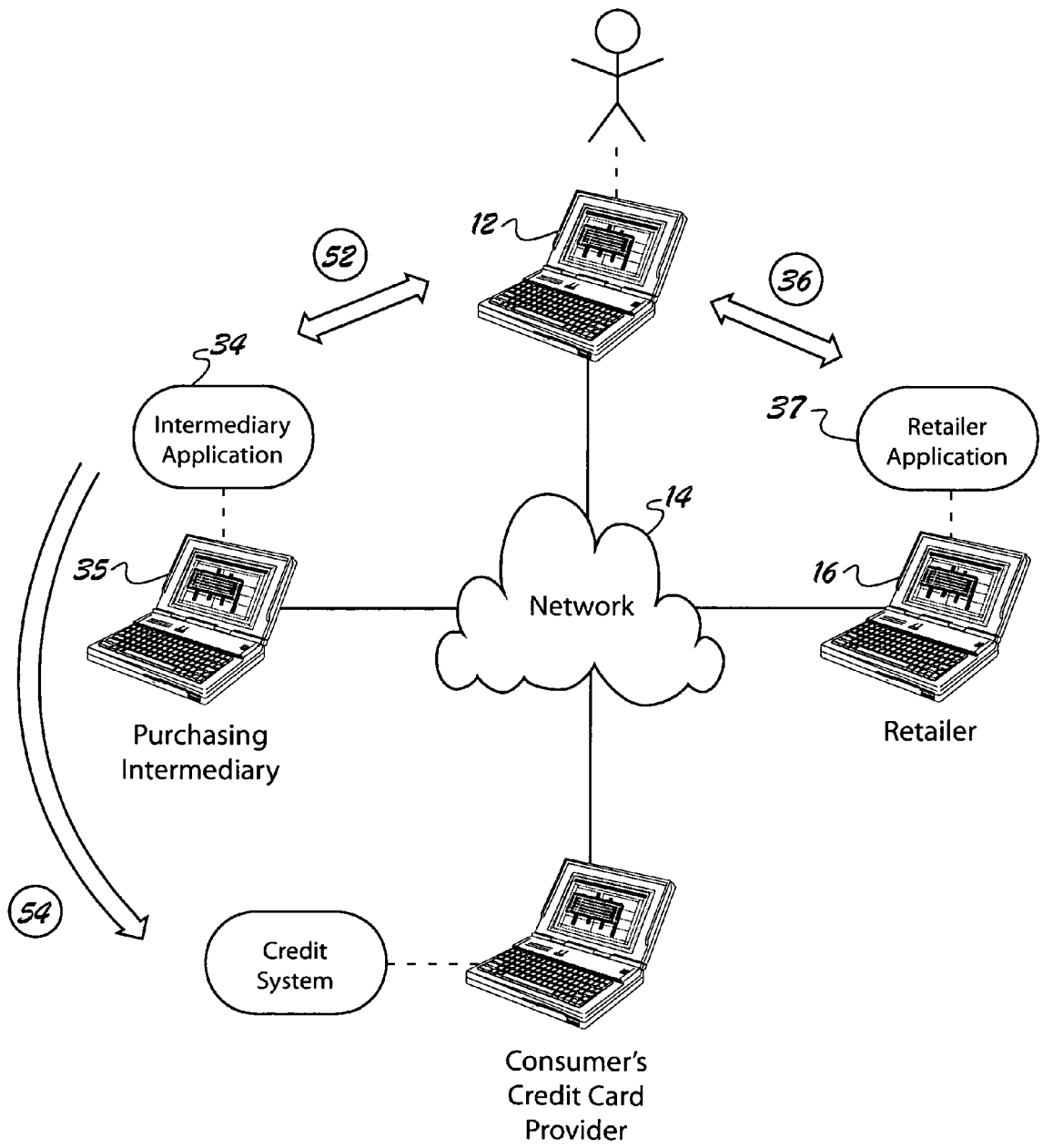
FIG. 5 is a detailed flow diagram of an alternative method for transacting an anonymous purchase in accordance with the present invention.

An alternative means for acquiring intermediary credit account information is described in relation to FIG. 5. Rather than visiting a retail establishment, the consumer may directly access 52 the intermediary application 34 in order to obtain intermediary credit account information. Instead of receiving a purchasing card, the consumer merely acquires the intermediary credit account information over the network 14. In this case, the intermediary application 34 is receptive of credit card information from the consumer and operative to provide intermediary credit account information to the consumer.

As part of this process, the consumer's credit card is debited 54 for the cost (e.g., $25, $50 or $100) associated with acquiring the intermediary credit account information. As previously explained, the intermediary credit account information includes a credit account number, an expiration date, and a credit limit (e.g., $23, $47 or $97) which is slightly less than the cost associated with the service. The consumer's monthly billing statement from the credit card provider will simply show the name of the purchasing intermediary and the aggregate amount of the purchase. Again, the intermediary credit account information is not linked to the consumer, thereby maintaining the anonymity of the purchaser in future Internet transactions.

Once the consumer acquires intermediary credit account information, they are free to use it to make an online purchase over the Internet as shown in either FIG. 3 or FIG. 5. The consumer must first accesses a retailer's software-implemented application 37 in order to transact a purchase 36. It is envisioned that the retailer's application 37 resides on the retailer's computing device 16 which is accessed via the network 14 using a purchasing computing device 12. In particular, the retailer's application 37 may be associated with a web site on the Internet. Furthermore, the retailer's application 37 is receptive of purchase transactional information from the consumer and operative to transact a purchase with the consumer over the network 14.

When the consumer is ready to make a purchase, they are prompted through a series of payment and shipping questions to provide purchase transactional information. As will be apparent to one skilled in the art, the purchase transactional information describes the purchased goods or services as well as provides payment information from the consumer, including the credit account number associated with the intermediary credit account information. The intermediary credit account information further provides at least some pseudo purchase transactional information to the consumer. For instance, each purchasing card may have the same or a different non-personalized cardholder name listed on the card. When the consumer is prompted by the retailer's application 37 to provide a name, they simply insert the cardholder name, for example the name of the purchasing intermediary or an alias such as "John Smith" as provided on the card. The consumer will also be prompted to provide the credit account number and the expiration date associated with the purchasing card. The account number, cardholder name and expiration date are then used by the retailer's application to complete the purchase transaction with the consumer in a manner known in the art. One skilled in the art will readily recognize that as part of transacting the purchase, the retailer's application 37 may verify 38 that the purchase price does not exceed the credit limit associated with the purchasing card. To do so, the retailer's application 37 may interface with an additional authorization system 39 as provided by either the purchasing intermediary or the credit card provider.

Of course, the consumer is free to make other purchases up to the credit limit associated with their intermediary credit account. In the case the purchasing card, the card can be discarded once the funds on the purchasing card are exhausted. In addition, any residual funds remaining on the consumer's purchasing card may be drawn out (e.g., using any ATM facility or bank) prior to the expiration date by the consumer.

In the event that the purchase is for goods which need to be shipped to the consumer, the consumer will also need to provide shipping instructions. The consumer has two options: (1) provide a shipping address (i.e., home or business address) or (2) utilize a forwarding service provided by the purchasing intermediary. It is noteworthy that the consumer's address does not alone generally ensure access to a consumer's credit history and other confidential personal information. Thus, a consumer may opt to provide a shipping address and yet retain anonymity from the retailer.

In the later case, the goods will be shipped to the purchasing intermediary who will then ship the goods to the consumer. To do so, the intermediary credit account information provides an intermediary shipping address which the consumer can provide to the retailer. The consumer's shipping address may be captured by the purchasing intermediary when the consumer is activating their purchasing card, and then, upon receipt of the goods from the retailer, it is used to ship the goods to the consumer. An additional service fee covering at least up to the shipping costs may be charged by the purchasing intermediary to the consumer. It is envisioned that the service fee may be debited to the available funds remaining on the purchasing card.

It is widely known that large retailers spend considerable money to circulate discount coupons to consumers. The present invention offers an alternative distribution channel for these retailers. In particular, the intermediary application 34 may further be operative to provide discount coupons to the consumer. While the consumer is either activating their purchasing card or acquiring intermediary credit account information, the consumer may select from a menu of participating retailers. The consumer would then be directed to a web site or other type of software application where they could check to see if any discount coupons were being offered by the retailer. If so, they could simply print the coupon on a printer attached to their local computing device 12. The consumer may also be asked to answer a short series of non-personal questions in conjunction with obtaining the coupon. The questions are typically designed to determine relevant product user information. By enabling retailers the ability to offer their coupons in conjunction with this service, the purchasing intermediary is then able to change a service fee to the retailer, thereby deriving another revenue stream.

While the above description consitutes the preferred embodiment of the invention, it will be appreciated that the invention is susceptible to modificatio, variation, and change without departing from the proper scope of fair meaning of the accompanying claims. service, the purchasing intermediary is then able to change a service fee to the retailer, thereby deriving another revenue stream.

While the above description consitutes the preferred embodiment of the invention, it will be appreciated that the invention is susceptible to modification, variation, and change without departing from the proper scope or fair meaning of the accompanying claims.

The invention claimed is:

1. A method of transacting a purchase, comprising:
distributing a plurality of unfunded purchase cards from a purchase card provider to a plurality of purchase card outlets, wherein each of the purchase cards is a bearer instrument having an associated account number issued by a major branded credit card organization, an expiration date and a non-personalized cardholder name selected by the purchase card provider printed thereon, wherein the purchase card does not include information identifying the specific perspective cardholder, wherein information associated with each of the purchase card accounts is maintained in a software implemented application operated by the purchase card provider;
issuing a purchase card to a cardholder at the a purchase card outlet;
contacting the purchase card provider to fund and activate the purchase card account of specific purchase card issued with a software implemented application or via the telephone; and
transacting a cardholder purchase at any one of a number of retailers not associated with the purchase card outlet which accepts credit cards of the major branded credit card organization, wherein the cardholder presents the purchase card and the retailer contacts the purchase card provider over a network connection to interface with the software implemented application transmitting the purchase amount and the purchase card account number without requiring the retailer to collect and transmit personalized cardholder identifying information, to verify using the software implemented retail application that the purchase card is unexpired and that the purchase amount does not exceed the cardholder's funding limit, whereupon the purchase card account information will be debited by the amount of the purchase and the account of the retailer will be electronically credited completing the purchase transaction.

2. The method of claim 1 wherein the non-personalized cardholder name is further defined as a name for the purchase card provider.

3. The method of claim 1 wherein the step of issuing a purchase card further comprises purchasing the purchase card from a purchase card outlet.

4. The method of claim 3 wherein the purchase card is provided by the purchase card provider to the purchase card outlet on a consignment basis.

5. The method of claim 3 wherein the purchase card has an associated initial purchase limit equal to an amount paid for the purchase card less a service fee assessed by the purchase card provider.

6. The method of claim 1 wherein the purchase card has an associated expiration date imprinted thereon which can be provided by the purchaser to the retailer and used by the retailer to transact the purchase.

7. The method of claim 1 wherein the purchase card includes an associated address for the purchase card provider, such that the address may be provided by the cardholder to the retailer as part of the purchase transaction.

8. The method of claim 1 wherein the purchase card is provided with contact information imprinted directly on the purchase card to enable the cardholder to contact the purchase card provider.

9. The method of claim 1 wherein the step of distributing the plurality of unfunded purchase cards further includes maintaining an electronic record associating the account numbers of the purchase cards distributed by the purchase card provider.

10. The method of claim 1 wherein each of the purchase cards has a card value imprinted on the face of the card.

11. The method of claim 1 wherein the purchase card has an expiration date imprinted on the face of the card.

12. The method of claim 1 wherein the purchase card provider is associated with a member financial institution of the credit card organization, wherein the purchase card is imprinted with an identifier of the credit card organization.

13. The method of claim 12 wherein the purchase cards are debit cards associated with the member financial institution and electronically cleared through its credit card organization where the distribution, funding and activation is administered by the purchase card provider acting as a intermediary between the member funding institution and the card holder.

14. A method of transacting a purchase, comprising:
distributing a plurality of unfunded purchase cards from a purchase card provider to a plurality of purchase card outlets, wherein each of the purchase cards is a bearer instrument having an associated account number issued by a major branded credit card organization, an expiration date, contact information for the purchase card provider and a printed non-personalized cardholder name located on the card, but, does not include the identity of the perspective cardholder, wherein information associated with each of the purchase card accounts is maintained in a software implemented application operated by the purchase card provider;

selling a purchase card to a cardholder at a retail purchase card outlet without requiring the cardholder paying in cash to provide any personal identifying information, wherein the purchase card account has an initial funded value and contacting the purchase card provider to fund the specific purchase card sold;

transacting a cardholder purchase at any one of a number of retailers not associated with the purchase card outlet which accepts credit cards of the major branded credit card organization, wherein the cardholder presents the purchase card and the retailer contacts the purchase card provider over a network connection using a retailer software application which communicates with the purchase card provide's software implemented application transmitting the purchase amount and the purchase card account number without requiring the cardholder to collect and provide personal cardholder identifying information, so that the retailer can verify that the purchase card is active, not expired and that the purchase does not exceed the cardholder's funding limit, whereupon the purchase card account is debited by the amount of the purchase, and an account of the retailer is electronically credited the purchase amount less a processing fee completing the purchase transaction.

15. The method of claim 14 wherein the step of distributing the plurality of unfunded purchase cards further includes maintaining an electronic record associating the account numbers of the purchase cards distributed by the purchase card provider.

16. The method of claim 14 wherein the purchase card provider is associated with a member financial institution of the credit card organization, wherein the purchase card is imprinted with an identifier of the credit card organization.

17. The method of claim 16 wherein the purchase cards are debit cards associated with the member financial institution and electronically cleared through its credit card organization where the distribution, funding and activation is administered by the purchase card provider acting as a intermediary between the member funding institution and the card holder.

18. The method of claim 14 wherein each of the purchase cards has a card value imprinted on the face of the card.

\* \* \* \* \*

UNITED STATES PATENT AND TRADEMARK OFFICE
CERTIFICATE OF CORRECTION

PATENT NO. : 7,328,181 B2  Page 1 of 1
APPLICATION NO. : 11/245732
DATED : February 5, 2008
INVENTOR(S) : David B. Sutton et al.

It is certified that error appears in the above-identified patent and that said Letters Patent is hereby corrected as shown below:

On the Face of the Patent:

Delete the title: "Method and System for Transacting an Anonymous Purchase Over the Internet"

and insert -- Method for Transacting a Purchase Using a Non-Personalized Purchase Card --.

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,328,181 B2 | Page 1 of 1 |
| APPLICATION NO. | : 11/245732 | |
| DATED | : February 5, 2008 | |
| INVENTOR(S) | : David B. Sutton et al. | |

It is certified that error appears in the above-identified patent and that said Letters Patent is hereby corrected as shown below:

On the Face of the Patent: Item [54] and Column 1, lines 1-3

Delete the title: "Method and System for Transacting an Anonymous Purchase Over the Internet"

and insert -- Method for Transacting a Purchase Using a Non-Personalized Purchase Card --.

This certificate supersedes the Certificate of Correction issued June 17, 2008.

Signed and Sealed this

Twenty-second Day of July, 2008

JON W. DUDAS
*Director of the United States Patent and Trademark Office*